United States Patent Office 3,043,326
Patented July 10, 1962

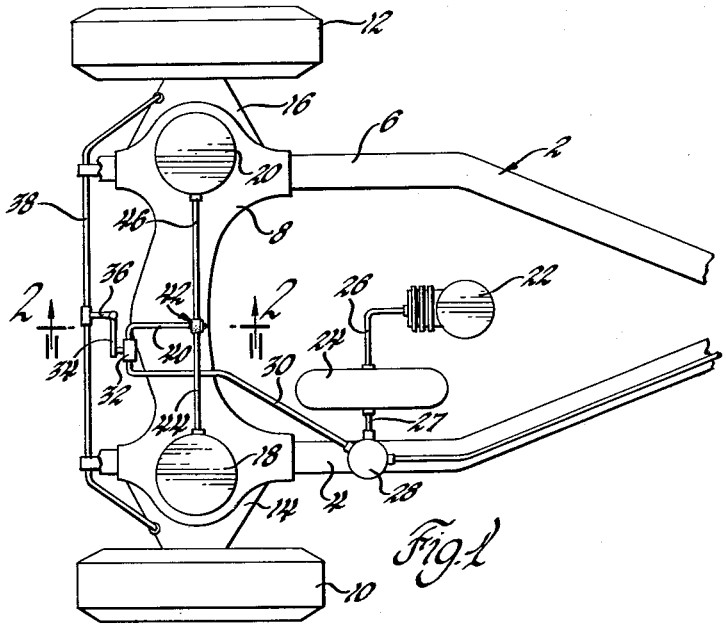

3,043,326
AIR SUSPENSION CONTROL APPARATUS
Charles W. Latreille, Troy, Mich., assignor to General Motors Corporation, Detroit, Mich., a corporation of Delaware
Filed July 18, 1960, Ser. No. 43,633
2 Claims. (Cl. 137—112)

This invention relates to vehicle suspension and more particularly to pneumatic suspension for motor vehicles.

Pneumatically suspended vehicles conventionally employ leveling valves which regulate the volume of air contained in the spring associated with each of the four wheels to maintain the vehicle sprung mass in a level attitude at a predetermined height. Although it is theoretically possible to maintain the vehicle in a level attitude by utilizing a separate leveling valve for each of the four air springs, as a practical matter, such as an arrangement proves unworkable owing to the fact that all four wheels of a vehicle are rarely resting on a single horizontal plane. Because of this fact, it has been the practice to utilize a separate leveling valve to control air flow into and out of each of the front or rear wheel springs, while a single leveling valve acts to control air flow into and out of both of the springs at the opposite end of the vehicle. In this manner, height sensing occurs at three points, and the tendency of the system to "hunt" is avoided. However, the three leveling valve control system inherently requires that the air springs controlled by the single leveling valve be connected in common communication, with the result that under conditions of vehicle roll, air tends to cross flow from one spring to the other. Since this cross flow occurs as a result of different pressure generated by vehicle roll, uninhibited cross flow tends to aggravate rather than resist roll. For this reason, various cross flow controlling devices have been proposed in the past. In each case, these devices operate to temporarily block or restrict the normal open communication between the two cross connected springs and thereby prevent roll aggravating air pressure transfer.

An object is to provide an improved cross flow controlling device for vehicle air suspension.

Another object is to provide a device of the stated character which is exceedingly simple in construction, low in cost and reliable in operation.

These and other objects, advantages and features of the invention will become more fully apparent as reference is had to the accompanying specification and drawing wherein:

FIG. 1 is a plan view of a portion of a vehicle pneumatic suspension system incorporating the invention;

FIG. 2 is an enlarged side elevational view, partly in section, of the cross flow control device incorporated in the suspension system of FIG. 1;

FIG. 3 is an enlarged plan view, partly in section, looking in the direction of arrows 3—3 of FIG. 2; and FIG. 4 is a view looking in the direction of arrows 4—4 of FIG. 2.

Referring now to the drawing and particularly FIG. 1, there is shown a portion of a vehicle chassis illustrating schematically an air suspension system and its relation to the air springs for the front wheels of the vehicle. The reference numeral 2 designates generally a vehicle frame having parallel longitudinally extending frame side rail portions 4 and 6 which are bridged at their forward ends by a transversely extending cross frame member 8. Disposed at lateral opposite sides of cross member 8 are a pair of wheels 10 and 12 which are oscillatably connected to frame 2 by transverse swing arms 14 and 16. Frame 2 is resiliently suspended relative to wheels 10 and 12 by air spring assemblies 18 and 20.

Springs 18 and 20 are supplied with air under pressure by means of an engine driven compressor 22 which is connected to an accumulator or storage tank 24 via conduit 26. Air contained within storage tank 24 is delivered through conduit 27 to a junction 28 and passes through conduit 30 to a height sensing leveling valve assembly 32 affixed to the forward portion of cross frame member 8. In the embodiment shown, leveling valve 32 is mechanically operated by a lever 34 which is pivotally connected to a rearwardly extending arm 36 mounted at the transverse midpoint of a conventional torsional roll stabilizer bar 38. In accordance with known practice, this manner of connecting the leveling valve lever 34 causes the leveling valve assembly to operate responsive to parallel vertical deflection of frame 2 only, while causing the valve to remain inactive during vehicle roll owing to the fact that the transverse midpoint of the stabilizer remains essentially stationary when the roll stabilizer is twisted equally at its opposite ends.

From leveling valve 32, air under pressure is directed through conduit 40 to a cross flow control device 42. From device 42 air is directed to spring 18 through conduit 44 and to spring 20 through conduit 46.

As seen best in FIG. 3, device 42 is formed with an inlet passage 48 which communicates with outlet passages 50 and 52 through restrictive orifices 54 and 56. Hence, air delivered through conduit 40 is free to pass directly into both conduits 44 and 46. Conversely, air is free to flow from springs 18 and 20 through their respective conduits 44 and 46 into conduit 40 and discharge to atmosphere through leveling valve 32.

In order to prevent cross flow of air from spring 18 to spring 20, or vice versa, under conditions of pressure differential therebetween, in accordance with the present invention device 42 is provided with a cavity 58 which is located so as to directly intersect the flow path between conduits 44 and 46. As seen best in FIG. 2, cavity 58 is formed with a flat bottom 60 perpendicular to inlet passage 48. From FIG. 4 it will be seen that the side wall of cavity 58 is contoured to form a generally elliptical central portion 62 having narrow slot portions 64 and 66 at either end thereof. Disposed in cavity 62 is blade 68 formed of rubber or other suitable flexible material. Blade 68 is of sufficient length so that the opposite ends thereof extend into slot portions 64 and 66, while the minor dimension thereof is aligned with the flow path through conduit 40 and intersects the flow path between conduits 44 and 46. As seen best in FIG. 4, creation of a differential pressure between springs 18 and 20 will cause the flexible blade 68 to deform laterally either to the right or left (as shown in dotted lines) depending upon the direction of pressure differential. Since the blade 68 is considerably wider than the diameter of either orifice 54 or 56, it will be evident that when deflected to the right or to the left the blade will overlap the wall portion of cavity 58 adjacent the affected orifice and block the latter thereby preventing movement of air from the high pressure to the low pressure side and therefore prevent cross flow between the springs 18 and 20. Naturally, as soon as the pressure differential created by vehicle roll has been relieved by return of the vehicle to the normal horizontal attitude, the natural elasticity of blade member 68 will cause it to resume its normal straight vertical position and allow introduction and exhausting of air from springs 18 and 20 in accordance with the height sensing operation of leveling valve 32.

In order to allow fabrication of cross flow control device 42 in an efficient and economical manner, the device is formed of a block 70 and a cover plate 72 which are secured together by machine bolts 74 and 76. From FIGS. 2 and 3, it will be evident that access may be had to cavity 58 by removal of cover 72, thus allowing insertion and removal of blade 68. In order to assure fluid tight sealing engagement between block 70 and cover plate 72, the face 78 of block 70 is formed with a "race track" groove 80 in which is disposed an O-ring seal 82, which is compressed by attachment of cover plate 72 to provide a sealed boundary surrounding the cavity 58.

From the foregoing it will be seen that a simple and inexpensive yet efficient cross flow device has been provided. It is to be especially noted that the construction lends itself admirably to low cost fabrication technique such as die casting or injection molding. Similarly, the device is easily assembled and disassembled. Furthermore, no part of the structure requires great accuracy or precision and the few removable parts may be quickly replaced under field service conditions.

While but one embodiment of the invention has been shown and described, it will be apparent that other changes and modifications may be made therein. It is, therefore, to be understood that it is not intended to limit the invention to the embodiment shown, but only by the scope of the claims which follow.

I claim:

1. A cross-flow control device comprising a body having a flat bottomed cavity formed in one face thereof, said cavity having opposite curved walls and slotted end portions, a first port in said body opening through the flat bottom of said cavity, second and third axially aligned ports in said body opening into said cavity through said curved walls, a flexible strip disposed in said cavity with its opposite ends located in said slots, a perimetrical groove formed in the face of said body surrounding said cavity, an O-ring in said groove and a cover plate secured over said face in abutting engagement therewith whereby said O-ring is compressed to form a fluid tight seal closing said cavity.

2. A cross-flow control device comprising a body having a flat bottomed cavity formed in one face thereof, said cavity having an elliptical central portion and slotted end portions, a first port in said body opening through the flat bottom of said cavity, second and third axially aligned ports in said body opening into said cavity through said curved walls, a normally straight, flexible strip disposed in said cavity with its opposite ends located in said slots, a perimetrical groove formed in the face of said body surrounding said cavity, an O-ring in said groove and a cover plate secured over said face in abutting engagement therewith, and means for securing said body and plate together whereby said O-ring is compressed to form a fluid tight seal closing said cavity.

References Cited in the file of this patent

UNITED STATES PATENTS

| | | |
|---|---|---|
| 249,557 | Truesdell | Nov. 15, 1881 |
| 1,897,174 | MacLean et al. | Feb. 14, 1933 |
| 2,466,441 | Keller | Apr. 5, 1949 |
| 2,906,281 | Pilotte | Sept. 29, 1959 |
| 2,955,843 | Chuba | Oct. 11, 1960 |

FOREIGN PATENTS

| | | |
|---|---|---|
| 539,895 | Great Britain | Sept. 29, 1941 |